T. H. PAUL.
Improvement in Car Axle Lubricators.

No. 124,618. Patented March 12, 1872.

Witnesses.
C. F. Brown
N. R. Ellsworth

Inventor.
Thos. H. Paul
By Hill & Ellsworth
attys.

UNITED STATES PATENT OFFICE.

THOMAS H. PAUL, OF FROSTBURG, MARYLAND.

IMPROVEMENT IN CAR-AXLE LUBRICATORS.

Specification forming part of Letters Patent No. 124,618, dated March 12, 1872.

*To all whom it may concern:*

Be it known that I, THOMAS H. PAUL, of Frostburg, in the county of Alleghany and State of Maryland, have invented certain new and useful Improvements in Car-Axle Lubricator; and I do hereby declare the following to be a full, clear, and exact description of the same, reference being had to the accompanying drawing forming a part of this specification, in which—

Figure 1:
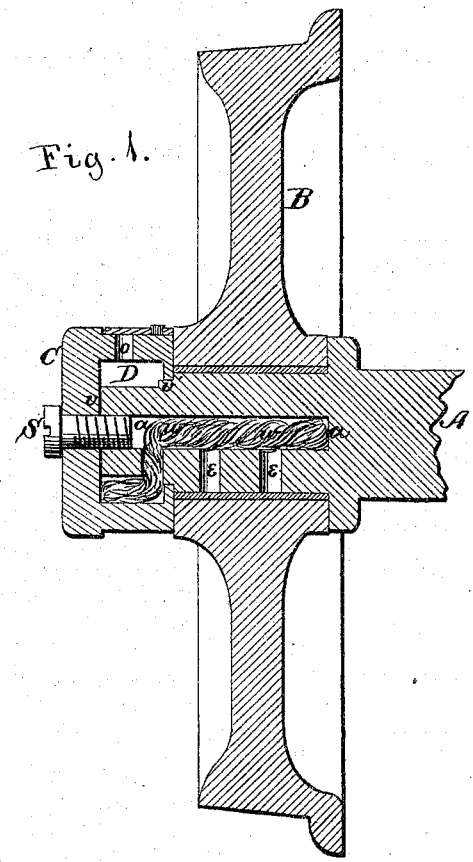
Figure 2:
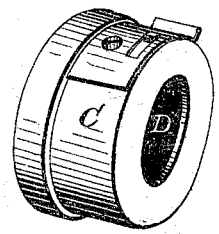

Figure 1 is a vertical section of the wheel and axle; and Fig. 2 is a perspective view of the cap detached.

Similar letters of reference indicate corresponding parts.

This invention relates to that class of railroad-car wheels which run, like an ordinary carriage-wheel, upon a fixed axle; and its object is to provide means for keeping the bearings constantly and effectually lubricated without waste of oil. To this end the invention consists, first, in the employment of a chambered cap, which screws upon the end of the axle and serves the double purpose of holding the wheel on and of furnishing a reservoir of oil to lubricate its bearings; and, secondly, in the formation of a cavity in the axle and the arrangement of a wick therein, leading from the oil-reservoir aforesaid to a series of discharge-openings at the under side of the axle, substantially as hereinafter set forth.

In the drawing, A is the axle; B, the wheel; and C, the cap, provided with a cylindrical cavity, D, which contains the lubricating fluid. The cap is attached to the end of the axle, as shown, by means of a screw, S, and in addition to or in lieu of this method of fastening it may be made to screw upon the axle by means of threads formed upon them at $v\ v'$. The oil is supplied to the chamber D through an opening, $o$, provided with any kind of cover that will prevent the fluid from escaping and the dust from entering. The cavity is designed to be kept nearly full of oil, which is slowly and continuously fed to the bearing by a wick, $w$, extending from the bottom of the chamber up into the central cavity $a$ of the axle, and thence along past a series of ducts, $e\ e$, which convey the lubricant to the bearings at different points.

When the cars are at rest the bearing effectually closes the ducts and prevents the escape of oil therefrom. The wheel is preferably made with spiral arms, chilled rim, and recessed hub, which I bush with the best quality of anti-friction metal, $m$, employing for that purpose any of the varieties known to the arts. The bushing may cover the ends of the hub as well as the bore, if preferred; if only the latter, the bore is cast rough, or even eccentric, so as to hold the anti-friction lining more firmly, and the latter is then run into it and molded or ground to a perfectly smooth cylindrical surface concentric with the tread of the wheel. When the bore is made eccentric to receive and hold the bushing, the elongation from the center is made downward, so that when it is filled with the anti-friction metal the latter will be slightly thicker at the under side of the axle, where the wear is much greater, than at the upper side.

Having thus described my invention, what I claim as new, and desire to secure by Letters Patent, is—

In combination with the chambered cap, the wick $w$, and cavities $a\ e\ e$, arranged substantially in the manner described.

THOS. H. PAUL.

Witnesses:
JOHN C. WEIS,
G. BERKEBILE.